United States Patent [19]

Myojo et al.

[11] Patent Number: 5,528,848
[45] Date of Patent: Jun. 25, 1996

[54] COUPLING SLEEVE FOR A FISHING ROD

[75] Inventors: Seiji Myojo, Sakai; Toshihiko Yasui, Tondabayashi, both of Japan

[73] Assignee: Shimano Inc., Osaka, Japan

[21] Appl. No.: 363,077

[22] Filed: Dec. 23, 1994

[30] Foreign Application Priority Data

Mar. 30, 1994 [JP] Japan .................................. 6-060534
Apr. 14, 1994 [JP] Japan .................................. 6-075223

[51] Int. Cl.6 ........................... A01K 87/00; A01K 87/02
[52] U.S. Cl. ..................................... 43/24; 43/18.1
[58] Field of Search ........................................ 43/24, 18.1

[56] References Cited

U.S. PATENT DOCUMENTS

| | | | |
|---|---|---|---|
| 1,833,787 | 11/1931 | Mauss | 43/25 |
| 2,334,646 | 11/1943 | Price | 43/18.1 |
| 2,729,012 | 1/1956 | Lee | 43/18 |
| 2,777,239 | 1/1957 | Cushman | 43/18.1 |
| 4,130,960 | 12/1978 | Fontenot | 43/18 |
| 4,183,163 | 1/1980 | Reimer | 43/24 |
| 5,456,038 | 10/1995 | Park | 43/24 |

FOREIGN PATENT DOCUMENTS

| | | |
|---|---|---|
| 2467546 | 4/1981 | France . |
| 963383 | 5/1957 | Germany . |
| 2165431 | 4/1986 | United Kingdom . |

Primary Examiner—J. Elpel
Attorney, Agent, or Firm—Shinjyu Office of Patent Attorneys

[57] ABSTRACT

A coupling sleeve for coupling the tip section of a hollow fishing rod to the butt section, which retains the reel. Fore and hind portions of the coupling sleeve serve as joints engageable with the tip and butt sections. The central portion of the coupling sleeve, of greater section modulus of elasticity than the joint portions, has a fishing line guide hole for guiding fishing line from the reel, through a bore connecting the guide hole with a tip socket in the fore joint, and into the hollow tip section of the fishing rod. Further there is at least one additional opening on the exterior of the coupling sleeve central portion, opening to the fishing line guide hole and thus serving to discharge water and debris scraped from the fishing line as it travels through the bore and on the rim of the guide hole.

8 Claims, 6 Drawing Sheets

COUPLING SLEEVE FOR A FISHING ROD

BACKGROUND OF THE INVENTION

The present invention relates to a coupling sleeve for a fishing rod, and more particularly, to a coupling sleeve for a hollow fishing rod, in which a fishing line passes through a hollow extent of the rod interior.

Fishing rods containing an interior passage for guiding fishing line are well-known. Fishing rods having multiple sections which may be disassembled from one another are also known. Further, a coupling sleeve interconnecting tip and butt sections of a hollow fishing rod is well known. For example, Japanese Unexamined Utility Model No. 80968/1988 discloses a coupling sleeve which has a fore joint for coupling to a rod tip section and a rear joint for coupling to a rod butt section. The coupling sleeve in the prior art is provided with a fishing line guide hole for guiding fishing line from a reel into the fishing rod and a fishing line supply hole leading to the fishing line guide hole via an intervening space.

The winding mechanism usually provided on the reel typically will oscillate the fishing line across the reel spool, to keep the windings level. With the hollow fishing rod having a coupling sleeve as above, the fishing line, oscillating as it is wound, thus contacts the rim of the fishing line guide hole. Water, debris and the like, brought into the rod along with the fishing line, are scraped off the fishing line at the rim of the fishing line guide hole. Consequently, such debris remains deposited below the fishing line guide hole, and can come into contact with the fishing line, giving rise to resistance on the fishing line as it travels.

Moreover, in the conventional coupling sleeve, mechanical stress concentrates in the portion of the sleeve where the fishing line guide hole is formed, which tends to diminish its structural strength.

SUMMARY OF THE INVENTION

It is an object of the present invention to facilitate removal of debris and other undesirable material brought into a hollow fishing rod by fishing line travel through the rod.

It is another object of the present invention to strengthen the portion surrounding a fishing line guide hole in a coupling sleeve for a sectional fishing rod.

In one aspect of the present invention, a coupling sleeve for a fishing rod comprises a sleeve body formed with a first end connectable with a tip portion of a hollow fishing rod; a second end connectable with a reel-mounting butt portion of the fishing rod; a central portion formed with a cavity (fishing line guide hole) open to a first exterior side of the coupling sleeve body, and a bore extending from the cavity into the first end of the coupling sleeve, wherein fishing line is extendable from the fishing rod reel, through the cavity, the bore, and the first end. The coupling sleeve body is further formed with an opening in the central portion extending from a second exterior side of the sleeve to the cavity.

Accordingly, water, debris and other undesirable matter that might otherwise hinder the travel of the fishing line through the rod discharge exteriorly through the opening.

In another aspect of the present invention, the central portion of the coupling sleeve body for a sectional, hollow-tipped fishing rod is formed to be greater in width than at least the first end at its greatest breadth. Accordingly, the central portions of the coupling sleeve along the cavity (fishing line guide hole) are thicker than the fore joint portion, which contains a socket engageable with the hollow tip section of the fishing rod. The structure of the coupling sleeve surrounding the cavity exhibits a greater section modulus of elasticity, and mitigates structural weakening where there might otherwise be greater concentration of bending stress.

These and other objects and advantages of the present invention will become more fully apparent from the detailed description below.

DESCRIPTION OF THE PREFERRED EMBODIMENTS

Figure 1:
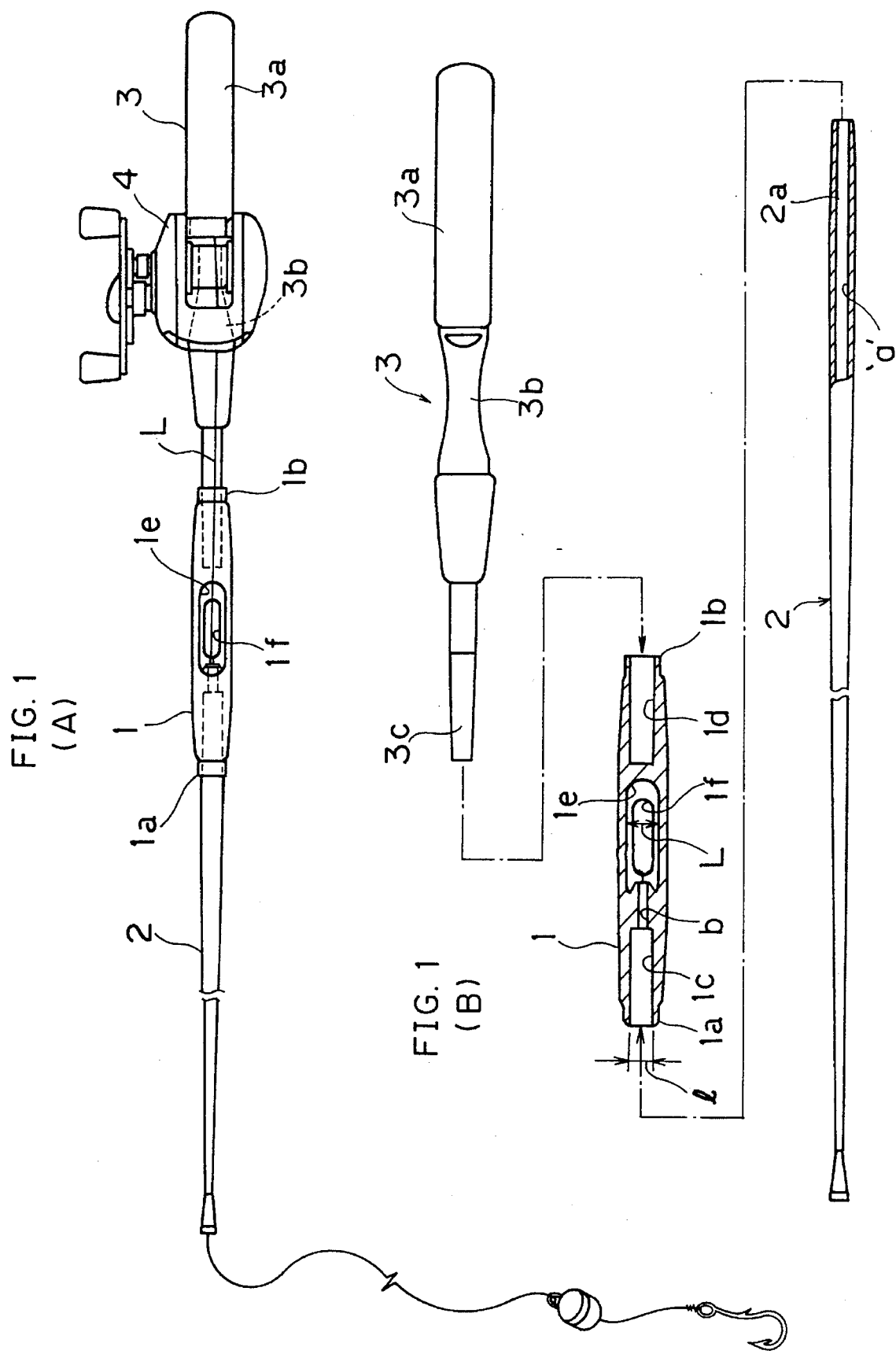
FIG. 1A is a fragmentary elevation of a fishing rod having a coupling sleeve in accordance with a first embodiment of the present invention.
FIG. 1B is a fragmentary, partial section, exploded view of the rod as in FIG. 1A, with tip and butt sections of the rod shown disassembled from the coupling sleeve shown in section.

A fishing rod, in accordance with a first embodiment of the present invention, is shown in FIG. 1. The fishing rod includes a hollow tip section 2, having a passage 'a' throughout its length, a butt section 3, and a coupling sleeve i for coupling sections 2 and 3. The butt section 3 includes a butt grip 3a at the hind end, and a reel seat 3b on which a reel 4 is mounted.

In a first end of the coupling sleeve 1 a fore joint 1a is formed. The fore joint 1a includes an engagement socket 1c. A basal end 2a of the tip section 2 is tapered and is engageable into the correspondingly tapered socket 1c. The central portion of the coupling sleeve 1 is formed with a top-opening cavity 1e. The cavity 1e is connected to the socket 1c by a bore 'b', which can serve as a fishing line passage. When the coupling sleeve 1 is coupled with the tip section 2, a continuous passage from the hollow of the tip section 2 through the cavity 1e is formed.

Formed in a second end of the sleeve 1 is a hind joint 1b. The hind joint 1b includes a tapered engagement socket 1d, and a correspondingly tapered end 3c of the butt section 3 is engageable into the socket 1d. When the coupling sleeve 1 couples the tip section 2 with the butt section 3 of a fishing rod accordingly, the cavity 1e serves as a fishing line guide hole in the top of the coupling sleeve 1 for guiding fishing line from the reel 4 to the inside of the fishing rod. Hence, the cavity 1e will also be referred to as a fishing line guide hole 1e hereinafter.

Figure 2:
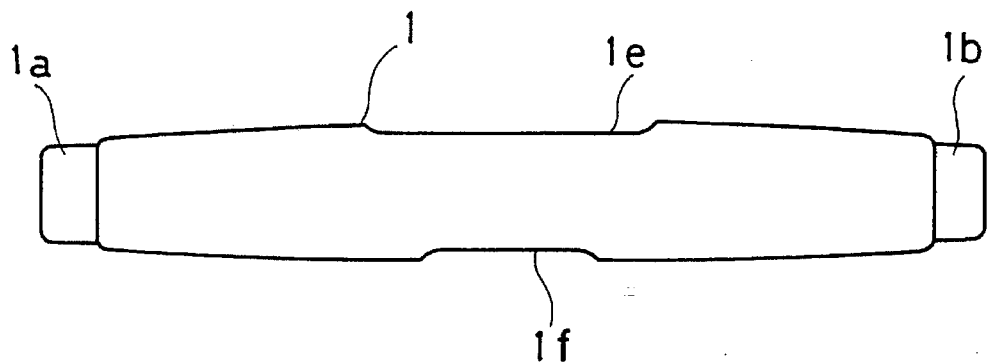
FIG. 2 is a side, slightly enlarged-scale view of the coupling sleeve.
Figure 3:
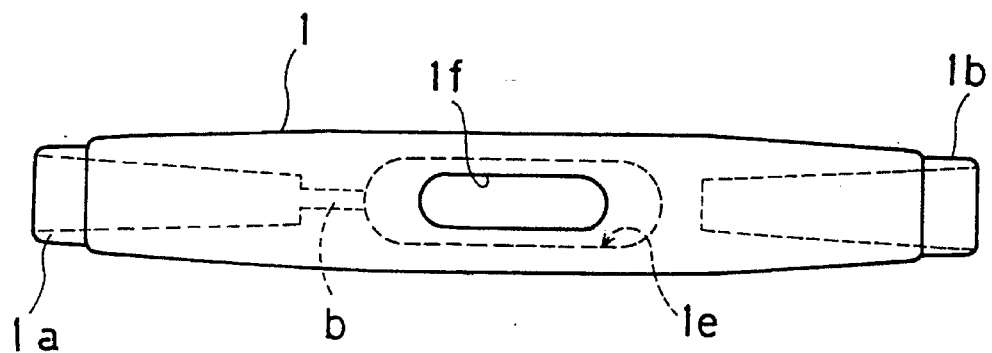
FIG. 3 is a bottom view of the coupling sleeve depicted in FIG. 2.

As shown on an enlarged scale in FIGS. 2 and 3, the fishing line guide hole 1e centrally extends into the sleeve 1 generally perpendicular to its longitudinal direction. An opening if is formed in the bottom of the sleeve 1 opposite and open to the fishing line guide hole 1e. The mouth of the fishing line guide hole 1e is larger than the opening 1f. Both the opening 1f and the guide hole 1e are elongate in the longitudinal direction of the fishing rod.

As is shown in FIG. 1(B) a width L of the fishing line guide hole 1e in the coupling sleeve 1 is greater than the maximum width l of the socket 1c. Accordingly, the central portions of the coupling sleeve 1 along the fishing line guide hole 1e are made thicker than the joint portions, so that the structure therein exhibits a greater section modulus of elasticity. The form of the coupling sleeve in this way mitigates structural weakening where there might otherwise be greater concentration of bending stress.

Fishing line for the sectional, hollow-tipped fishing rod coupled together by the coupling sleeve 1 as described above will travel to and from the reel 4 mounted on the butt section 3, passing down through the fishing line guide hole 1e, through the bore 'b', and thus through the passage 'a' of the tip section 2.

In use then, water, debris and the like are brought into the hollow interior portions of the rod along with the fishing line as it is wound onto the reel. As the fishing line moves within the rod, the water, debris and the like are scraped off as the fishing line passes through the bore (fishing line passage) 'b', and by the rim of the fishing line guide hole 1e, the greater portion of debris being deposited in the cavity 1e. Debris and other undesirable material discharges exteriorly through the opening if formed in the bottom surface of the coupling sleeve 1.

Figure 4:
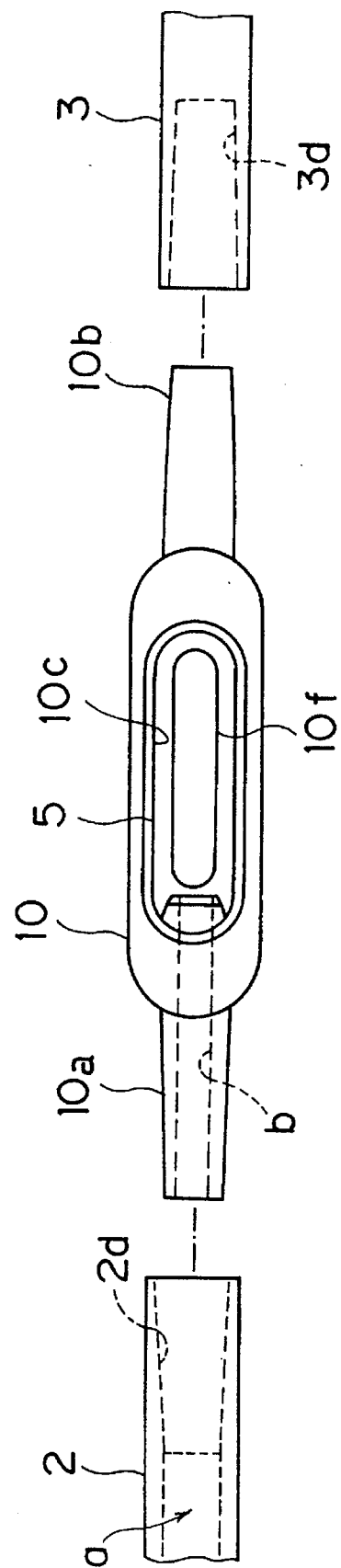
FIG. 4 is a fragmentary exploded top view of the coupling sleeve with portions of a fishing rod shown disassembled, in accordance with another embodiment of the present invention.

FIG. 4 illustrates another preferred embodiment according to the present invention. A coupling sleeve 10 in this embodiment has a tubular, tapered fore joint 10a at a first end, engageable with a hollow fishing rod tip section 2, and a tapered hind joint 10b at a second end, engageable with a butt section 3. The hollow interior of the tip section 2 defines a passage 'a' that extends throughout the tip section 2. A guide hole 10c in the top of the coupling sleeve 10 centrally extends into the coupling sleeve 10 generally perpendicular to its longitudinal extension. An opening 10f is formed in the bottom of the sleeve 10, opposite and open to the fishing line guide hole 10c. In the basal end of the tip section 2 is a socket 2d tapered to fit correspondingly the fore joint 10a of the coupling sleeve 10. The butt section 3, in an end corresponding to the coupling sleeve 10, has a socket 3d tapered to fit the hind joint 10b. A bore 'b' extends from the end of the tapered fore joint 10a to the guide hole 10c.

In this embodiment, moreover, rimming the fishing line guide hole 10c is a lip 5. The lip 5 decreases frictional resistance on the fishing line when sliding on the rim of the fishing line guide hole 10c. The lip 5 may be made of a rigid material such as ceramics, or of a flexible material such as rubber. A fishing line can extend through the guide hole 10c, the bore 'b' and into the hollow interior 'a' of the tip section 2.

Figure 5:
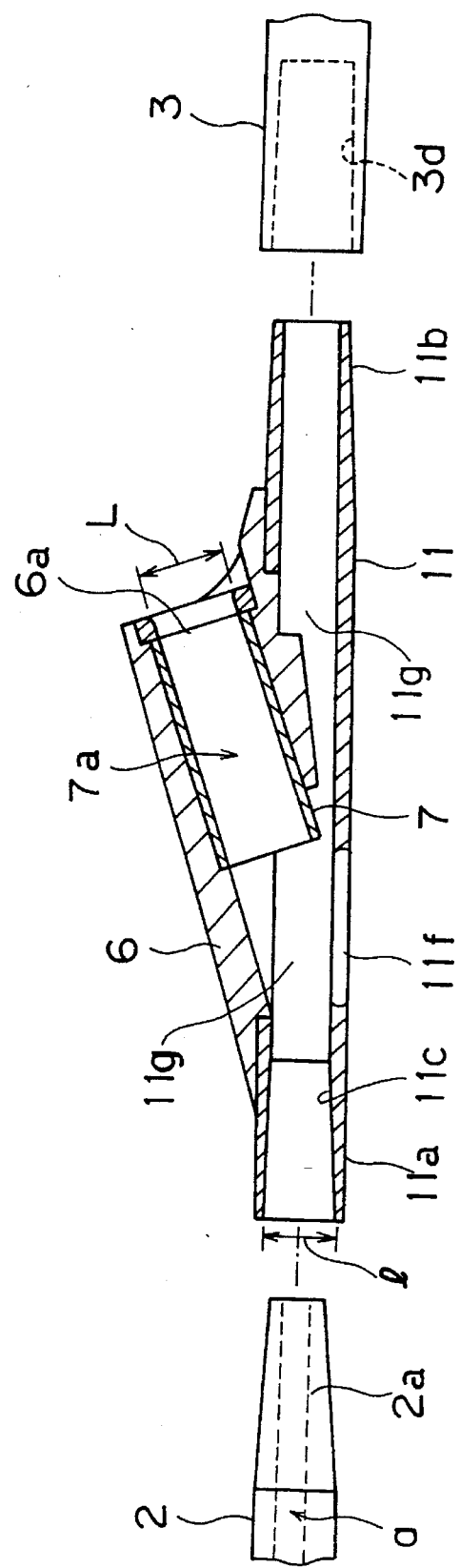
FIG. 5 is a fragmentary exploded side section of a coupling sleeve with portions of the fishing rod disassembled from the sleeve, in accordance with still another embodiment of the present invention.

In a further embodiment, illustrated in FIG. 5, a block-shaped guide extension 6, through which fishing line may pass, is provided in a top surface of a hollow coupling sleeve 11. The hollow interior of the coupling sleeve 11 defines a passage 11g. A tube 7 is fitted into the guide extension 6, defining a guide opening 6a at one end and extending into the upper surface of the sleeve 11 at the opposite end. The hollow interior of the tube 7 defines a passage 7a. A fore joint 11a at a first end of the coupling sleeve 11 contains a tapered hole (fishing line supply hole) 11c engageable with a tapered basal end 2a of hollow fishing rod tip section 2. A passage 'a' is formed axially through the tip section 2. A hind joint 11b at a second end of the coupling sleeve 11 is peripherally tapered so as to be engageable into a socket 3d of a correspondingly tapered fishing rod butt section 3. Further, the bottom surface of the coupling sleeve 11 is perforated by an opening 11f.

When the coupling sleeve 11 is coupled with the tip section 2, the passage 'a' is open to the passage 11g and the passage 7a, defining a continuous passage from the hollow of the tip section 2 through the coupling sleeve 11, and the guide opening 6a.

Also, in this embodiment, width L of the fishing line guide hole 6a is greater than diameter l at the opening of the coupling sleeve 11 fishing line supply hole.

Figure 6:
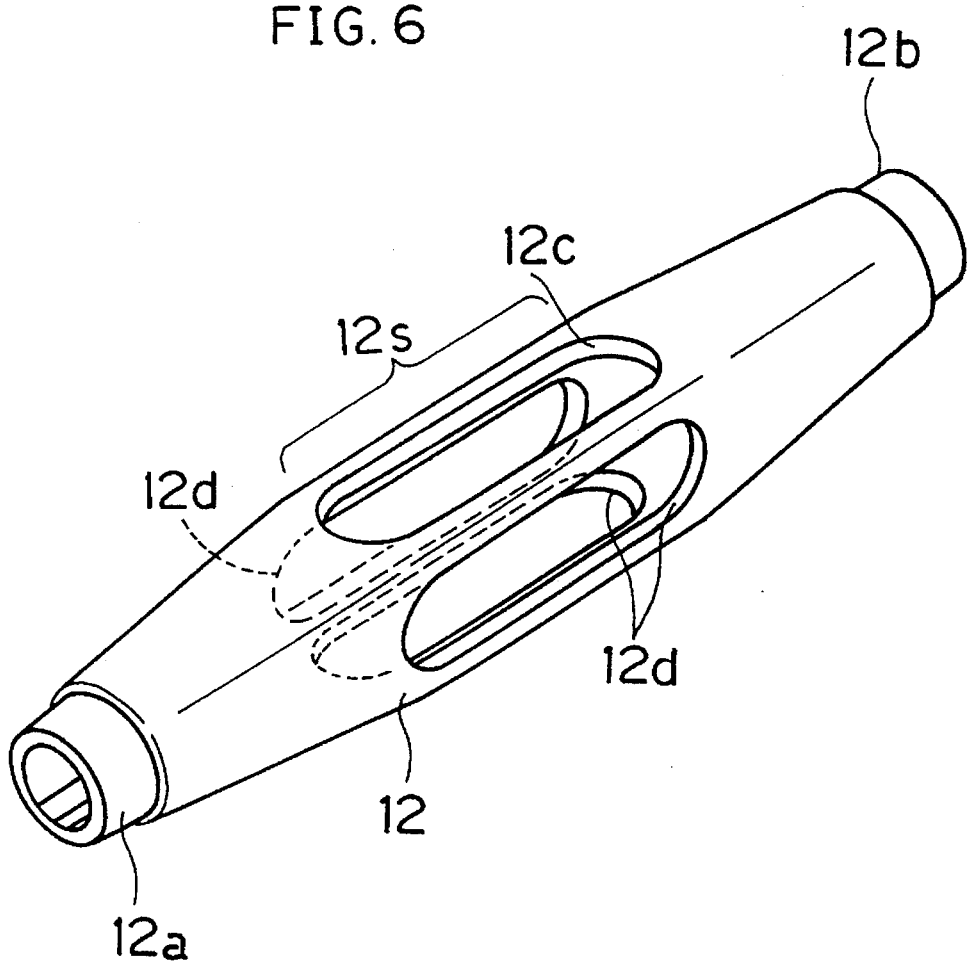
FIG. 6 is an isometric view of a coupling sleeve of a fishing rod in accordance with a further embodiment the present invention.

In a still further embodiment of the present invention, illustrated in FIG. 6, a coupling sleeve 12 is formed having a central portion 12s that is generally square in cross section. The coupling sleeve 12 tapers into cylindrically tubular opposing ends. Engageable with a hollow fishing rod tip section 2 (not shown in FIG. 6), a first end of the coupling sleeve 12 has a fore joint 12a, and at a second end is a hind joint 12b, engageable with a fishing rod butt section 3 (also not shown in FIG. 6). In the central portion 12s between the fore and hind joints 12a and 12b, a fishing line guide hole 12c is formed, defining a top surface of the coupling sleeve 12, while openings 12d are for:reed in the three remaining orthogonal surfaces of the central portion 12s, each of the openings 12d, and the guide hole 12c opening to the hollow interior of the coupling sleeve 12.

Figure 7:
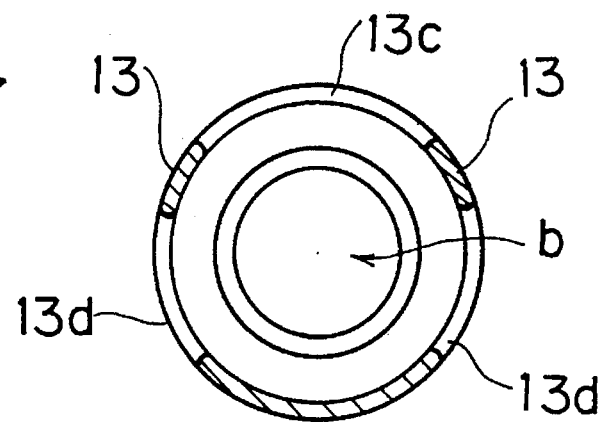
FIG. 7 is a cross section of a coupling sleeve of a fishing rod in accordance with yet another embodiment of the present invention.

In yet another embodiment, illustrated in FIG. 7, a hollow coupling sleeve 13 is tubular over its entire length. The coupling sleeve 13 is provided with a fishing line guide hole 13c, defining a top surface of the sleeve 13. Two openings 13d, each at an angular interval of approximately 120° to the fishing line guide hole 13c, are open to the exterior of the sleeve 13. A bore 'b' extending through one end of the sleeve 13 allows a fishing line to extend from the sleeve into a hollow tip section 2 (not shown in FIG. 7).

Figure 8:
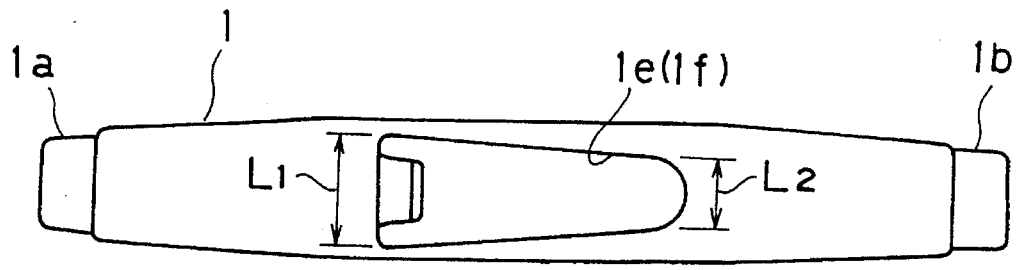
FIGS. 8 and 9 are top views of a fishing rod coupling sleeve in accordance with further embodiments of the present invention.
Figure 9:
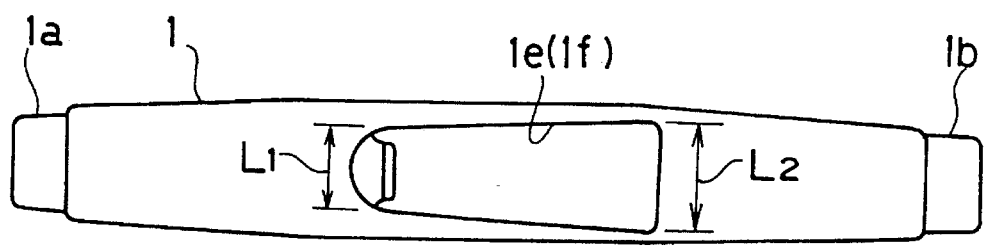

In yet further embodiments, illustrated in FIGS. 8 and 9, the fishing line guide holes 1e are formed in an upper surface of a coupling sleeve 1. An opening If is formed in a bottom surface of the coupling sleeve 1, having a shape corresponding to the shape of the hole 1e. In the embodiment as shown in FIG. 8, width L1 at a first end of the fishing line guide hole 1e is greater than width L2 at a second end of the guide hole 1e. Corresponding width L1 is less than corresponding width L2 in the embodiment as shown in FIG. 9.

Figure 10:
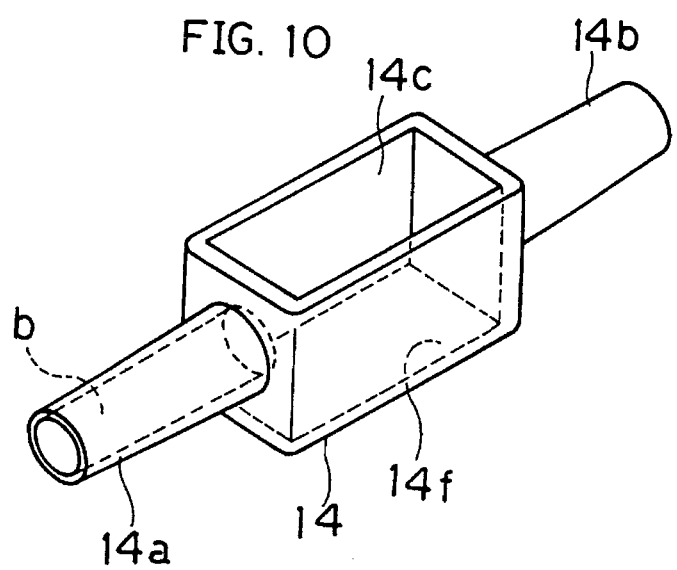
FIG. 10 is an isometric view of a fishing rod coupling sleeve in accordance with yet another embodiment of the present invention.

In yet another embodiment as illustrated in FIG. 10, the central portion of a coupling sleeve 14 is formed as an open-ended box. A top end of the coupling sleeve central portion serves as a fishing line guide hole 14c, and the corresponding bottom end serves as a debris discharge opening 14f. A fore joint 14a engageable with a tip section 2 and a hind joint 14b engageable with a butt section 3 are tubular and respectively taper from the central box portion.

The fore joint 14a is provided with a bore 'b' that extends from the hole 14c to the end of the joint 14a.

Since in this case there are no horizontal walls lying in the upper and lower portions of the coupling sleeve 14, less debris and other undesirable material are liable to remain in the fishing line guide hole 14c.

It should be understood that the coupling sleeve openings in the embodiments as described above are not necessarily limited to the given shapes, but may be other shapes as well. Further, the position of the openings could be elsewhere along the coupling sleeve than described above, so long as they open to the fishing line guide hole so as to effectively discharge water, debris and the like from off the fishing line in use.

The present invention is applicable not only to a hollow fishing rod, but to a hollow fishing rod with a fishing line guide.

To couple the joints of the coupling sleeve as described in the foregoing to the fishing rod tip and butt sections, respectively, screws may be used. Alternatively, O-rings may be fitted along the peripheries or the bores of the corresponding engaging portions of the coupling sleeve and the tip and butt sections, so as to bring about tighter coupling.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A coupling sleeve for a fishing rod, comprising a sleeve body formed with:
   a first end connectable with a hollow tip portion of a fishing rod;
   a second end connectable with a reel portion of a fishing rod;
   a central portion formed with a cavity open to a first exterior side of said sleeve body,
   a bore extending from said cavity into said first end, wherein fishing line is extendable from a reel mountable to said reel portion of a fishing rod, through said cavity, said bore, and said first end; and
   an opening in said central portion extending from a second exterior side of said sleeve body to said cavity.

2. A coupling sleeve according to claim 1, wherein said cavity opens to said first exterior side generally diametrically opposed to said opening.

3. A coupling sleeve according to claim 1, said cavity having an elliptical, elongate contour, and said second exterior side opening also having an elliptical, elongate contour.

4. A coupling sleeve according to claim 1, wherein a lip is formed rimming said cavity where said cavity opens to said first exterior side, for reducing friction on a fishing line travelling between said reel mountable to the reel portion of a fishing rod and said bore.

5. A coupling sleeve according to claim 1, wherein a plurality of openings are formed in corresponding exterior sides of said sleeve body and open into said cavity.

6. A coupling sleeve according to claim 1, wherein said central portion is greater in width than said first end at its greatest breadth.

7. A coupling sleeve according to claim 1, wherein the central portion of said sleeve body is formed with a hollow guide extension from the cavity, through said first exterior side and opening exteriorly.

8. A fishing rod, comprising:
   a hollow tip section;
   a butt section to which a fishing line reel is mountable; and
   a coupling sleeve, comprising a sleeve body formed with:
      a first end connectable with said hollow tip section;
      a second end connectable with said butt section;
      a central portion formed with a cavity open to a first exterior side of said sleeve body;
      a bore extending from said cavity into said first end, wherein fishing line is extendable from the reel mountable to said butt section through said cavity, said bore, and said first end; and
      an opening in said central portion extending from a second exterior side of said sleeve body to said cavity.

* * * * *